(12) United States Patent
Hankinson et al.

(10) Patent No.: US 8,419,123 B2
(45) Date of Patent: Apr. 16, 2013

(54) AIRCRAFT SEAT

(75) Inventors: Christopher Hankinson, Kingsley (GB); Benedict Nicholas Samuels, Cranbrook (GB)

(73) Assignee: Zodiac Seats UK Limited (GB)

( * ) Notice: Subject to any disclaimer, the term of this patent is extended or adjusted under 35 U.S.C. 154(b) by 537 days.

(21) Appl. No.: 12/594,592

(22) PCT Filed: Apr. 2, 2008

(86) PCT No.: PCT/GB2008/001160
§ 371 (c)(1),
(2), (4) Date: Apr. 14, 2010

(87) PCT Pub. No.: WO2008/122761
PCT Pub. Date: Oct. 16, 2008

(65) Prior Publication Data
US 2010/0193634 A1   Aug. 5, 2010

(30) Foreign Application Priority Data

Apr. 5, 2007   (GB) .................................. 0706775.4

(51) Int. Cl.
*B60N 2/32* (2006.01)
*B60N 2/00* (2006.01)
*B60N 2/02* (2006.01)
*B64N 13/00* (2006.01)

(52) U.S. Cl.
USPC ... 297/118; 297/354.13; 297/342; 297/118.6; 297/122 R

(58) Field of Classification Search ............... 244/118.6, 244/122 R; 297/118, 354.13, 318, 342, 362.12; 5/12.1
See application file for complete search history.

(56) References Cited

U.S. PATENT DOCUMENTS

| 6,170,786 | B1 | 1/2001 | Park |
| 6,412,870 | B1 * | 7/2002 | Higgins et al. ................. 297/342 |
| 6,692,069 | B2 * | 2/2004 | Beroth et al. .................. 297/118 |
| 7,665,693 | B2 * | 2/2010 | Bettell ....................... 244/122 R |
| 7,837,259 | B2 * | 11/2010 | Staab et al. .................... 297/118 |
| 2004/0036336 | A1 * | 2/2004 | Veneruso ................. 297/354.13 |
| 2005/0077761 | A1 | 4/2005 | Dryburgh |
| 2005/0168042 | A1 | 8/2005 | Williamson |

FOREIGN PATENT DOCUMENTS

| EP | 0 957 025 | 11/1999 |
| EP | 1 074 468 | 2/2001 |
| GB | 1074468 | 2/2001 |
| WO | WO 2007072045 | 6/2007 |

* cited by examiner

*Primary Examiner* — Milton Nelson, Jr.
(74) *Attorney, Agent, or Firm* — Dean W. Russell; Kilpatrick Townsend & Stockton LLP

(57) ABSTRACT

An aircraft seat has a chassis (21), fixed to a pallet which is fixed to the floor of the aircraft. The chassis has two load bearing sides (23) and opposite ends (24, 25). Fixed along the top edge of the sides (23) and facing outwards are pins (26) supporting bearing wheels (27). These on each side engage with a rectangular S form interconnection beam (28) having an inside groove (29) for receiving these wheels. On the outside, the beam has another groove (30) receiving similar wheels (31), on pins (32) fixed to the inside of side plates (41) of a sub-frame (42), these side plates being interconnected by front and rear beams (43, 44). Thus the sub-frame can move back and forth, with the wheels acting as rolling element bearings. The beams move half the distance of the sub-frame, in analogous manner to the bearing of filing cabinet drawers.

13 Claims, 15 Drawing Sheets

AIRCRAFT SEAT

The present invention relates to an aircraft seat, in particular one convertible to a bed.

Regulations prescribe that convertible and other seats shall have their backrest up for taxiing, take-off and landing—TTL. In this specification, these initials are used for this state of the seat.

The object of the present invention is to provide aircraft seat convertible to a bed According to the invention, we provide an aircraft seat convertible to a bed comprising:
a seat having:
   a squab and a backrest, both being movable and
   a mechanism for moving the squab and the backrest, the mechanism having:
      a seat chassis, via which the seat can be fixed to a floor,
      a linear runner mounted on the seat chassis,
      a seat frame sub-frame bearingly mounted on the linear runner,
      linear drive means for extending (and retracting) the sub-frame on the runner with respect to the seat chassis between a retracted TTL position and an extended bed position,
      a pan for the squab pivotally mounted on the sub-frame,
      pan angle drive means for pivoting the pan between a back dropped TTL position and a bed position,
      a support for the back rest hinged to the pan,
      back drive means for moving the back rest support between a back up TTL position and a bed position.

For bearing mounting of the seat frame sub-frame on the linear runner, plain bearings are conceivable, however rolling element bearings will normally be provided. The linear runner itself is preferably duplicated, one on one side of chassis and seat frame sub-frame and another on the other.

The linear drive means can be of the lead screw type. However, as in the preferred embodiment, we prefer to use a pair of belts one associated with one linear runner and the other with the other. The two belts are driven in tandem.

In the preferred embodiment, each linear runner includes an interconnection beam provided between the chassis and the sub-frame, the beam having an S cross-section, with certain of the rolling element bearings attached to the chassis engaging in one groove of the beam and the other of the rolling element bearings engaging in the other groove.

Further the seat of the preferred embodiment includes:
sub-frame drive belts arranged at both sides of the chassis;
pulleys at opposite ends of the chassis for guiding the drive belts;
drive pulleys engaging the drive belts in one run of the belts between the guide pulleys;
a drive motor mounted on the chassis and drivingly connected to the drive pulleys;
pinch pulleys for normally engaging the belts with the drive pulleys;
means for manual disengagement of the pinch wheels to allow the drive belts to move past the drive pulleys and
means for securing the other run of the drive belts to the sub-frame.

Whilst it is conceivable to pivot the pan to the sub-frame at a position spaced back in the seat from the front of the sub-frame, in the preferred embodiment the position is at the front. Again, alternatives for the pan angle drive means are possible, such as a crank depending below the pan and an actuator for moving a lower end of this back and forth. In the preferred embodiment, there is a depending link, pivoted to the pan and guided at its lower end in a cam groove, along which it is driven by a lead screw, having a drive nut pivotally mounted on the sub-frame.

The back rest support can be conventionally hinged to the sub-frame. However since the hinge axis needs to be close to the front surface of the squab and backrest, in order to avoid a gap between and/or collision of the respective upholstery, and such a hinge can be intrusive, in the preferred embodiment, the hinge is a multi-link linkage providing a pivot axis spaced below the links themselves.

Preferably the back drive means is an arm extending back and below the back support, connected at its distal end to a lead screw actuator mounted in the sub-assembly.

To help understanding of the invention, a specific embodiment thereof will now be described by way of example and with reference to the accompanying drawings, in which.

Figure 1:
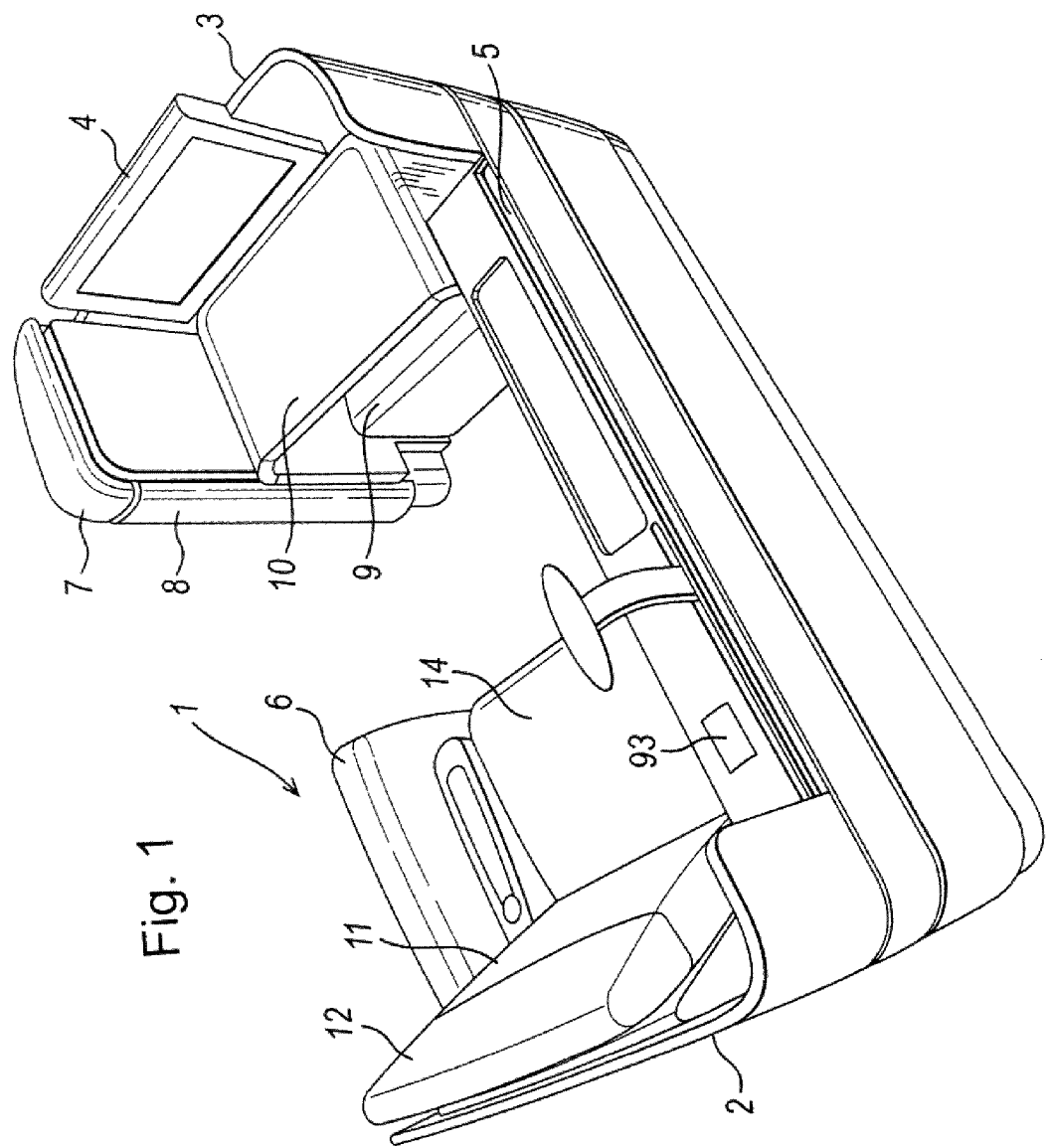
FIG. 1 is a perspective view of an aircraft seat convertible to a bed in accordance with the invention installed in a cubicle, the seat being in its TTL position.
Figure 2:
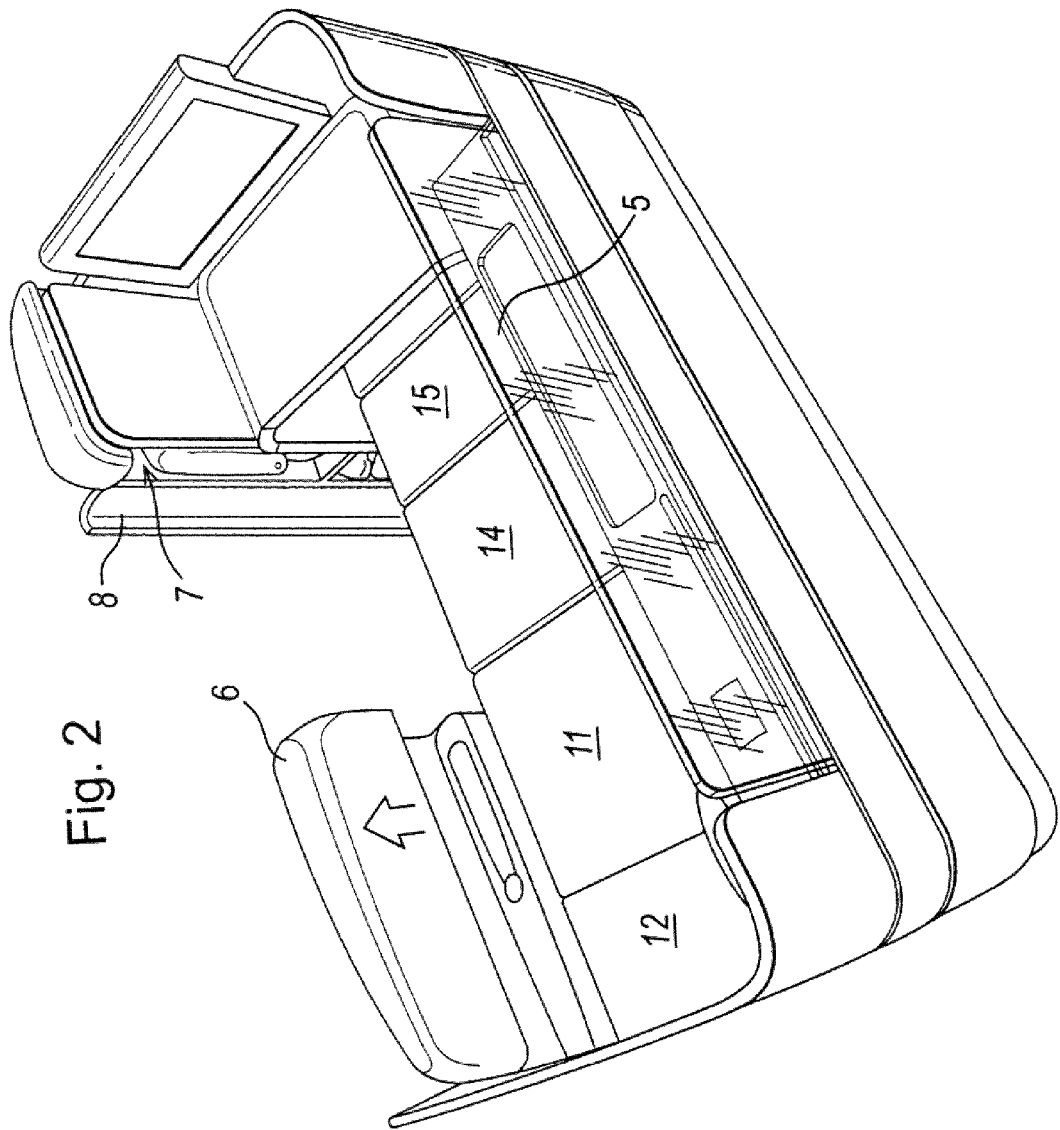
FIG. 2 is a similar view of the seat of FIG. 1 in its bed position.
Figure 3:
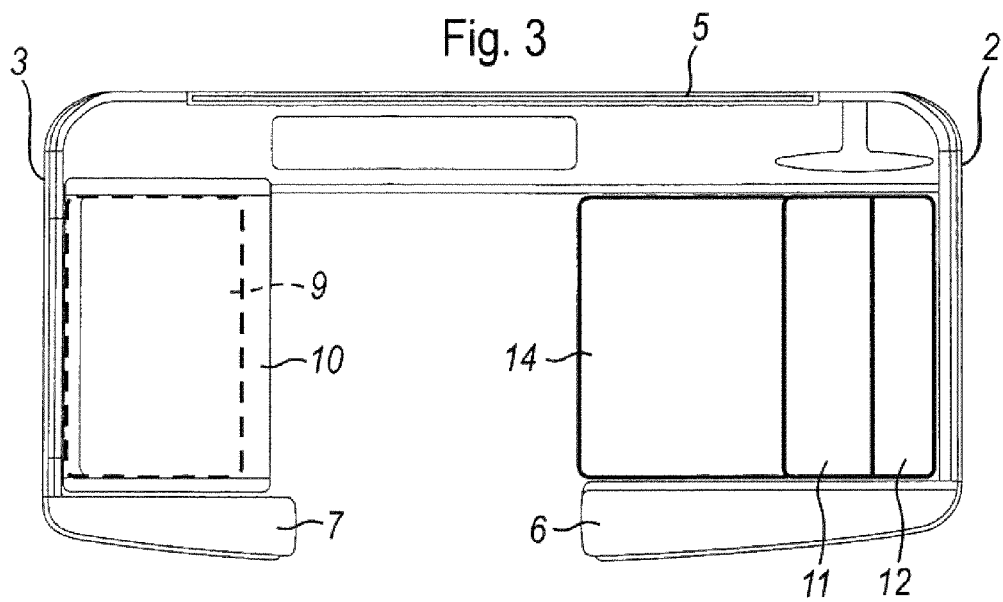
FIG. 3 is a pictorial plan view of the seat in the TTL position.
Figure 4:
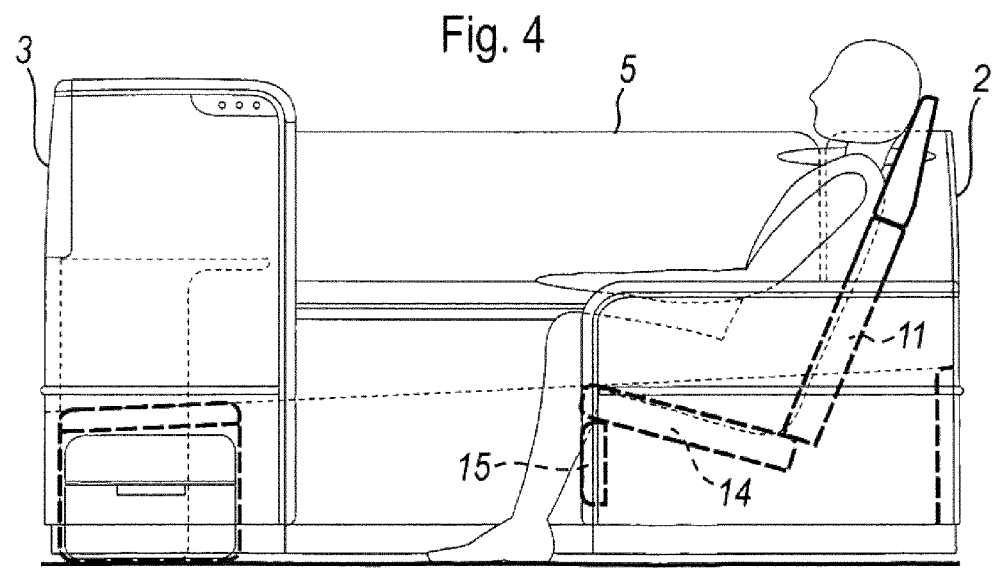
FIG. 4 is a pictorial side view of the seat in the TTL position.
Figure 5:
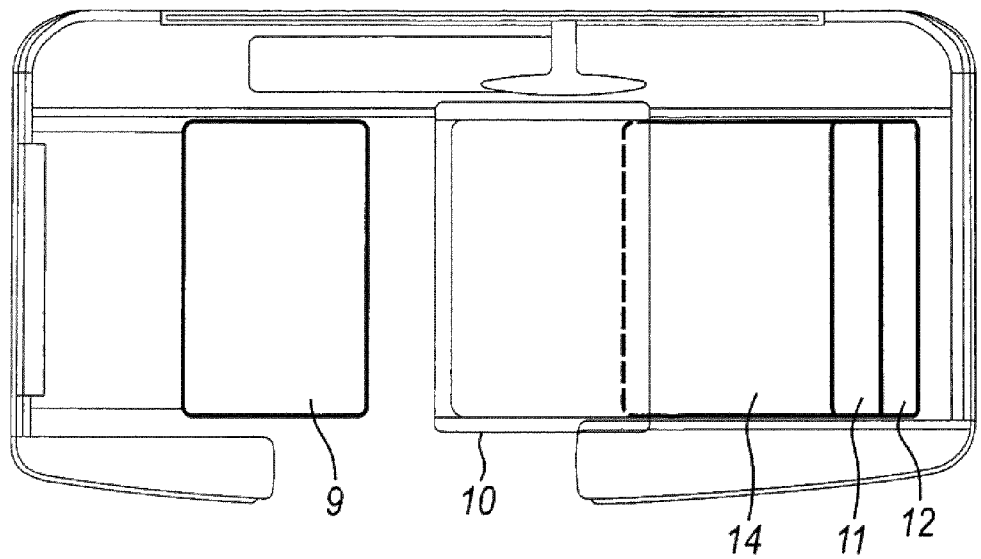
FIG. 5 is a pictorial plan view of the seat in the dining position.
Figure 6:
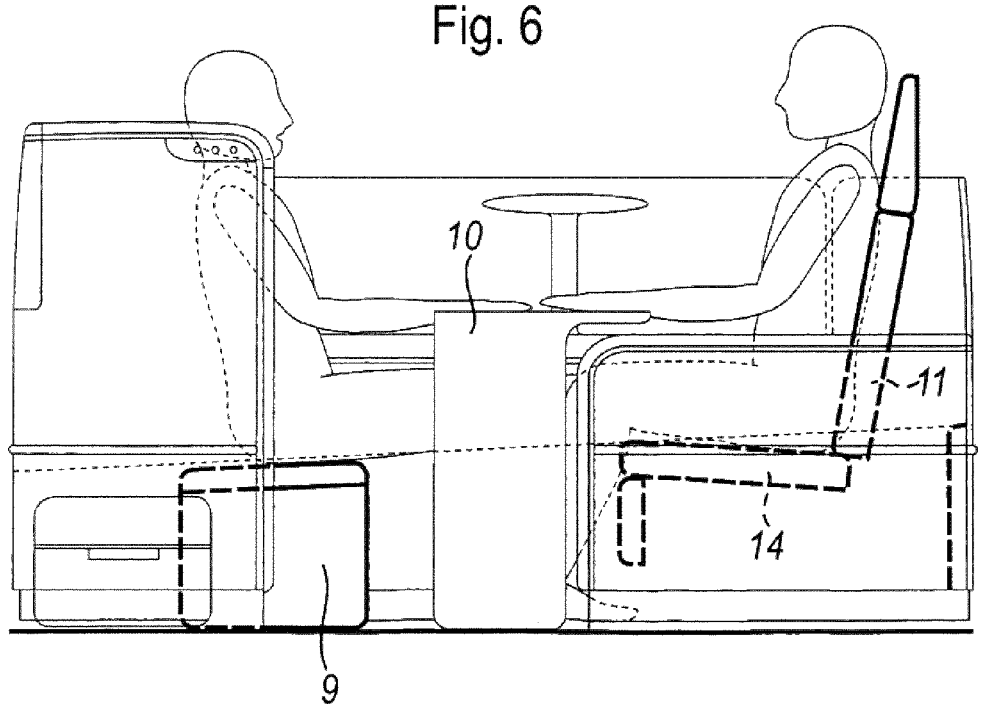
FIG. 6 is a pictorial side view of the seat in the dining position.
Figure 7:
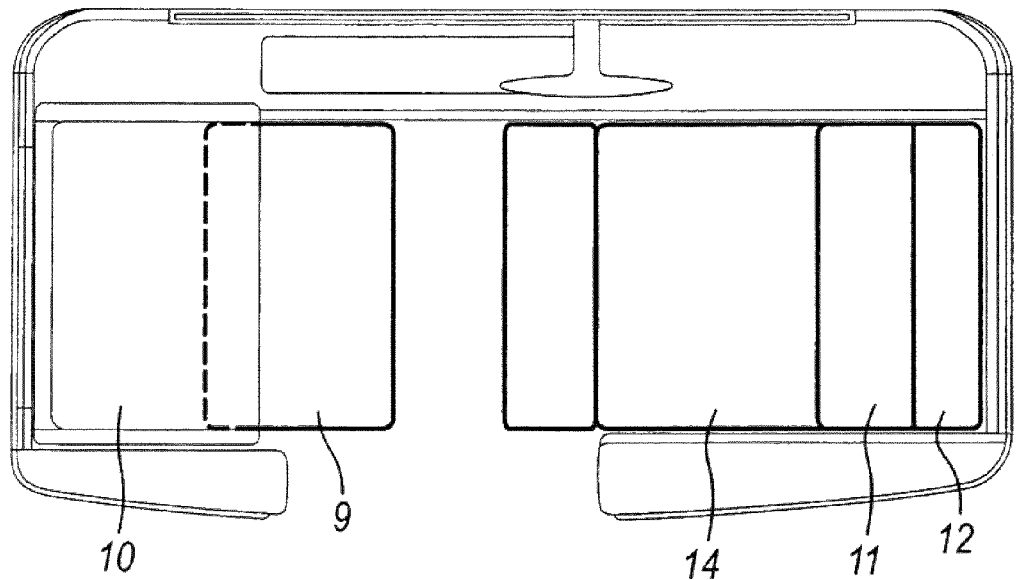
FIG. 7 is a pictorial plan view of the seat in an after dinner position.
Figure 9:
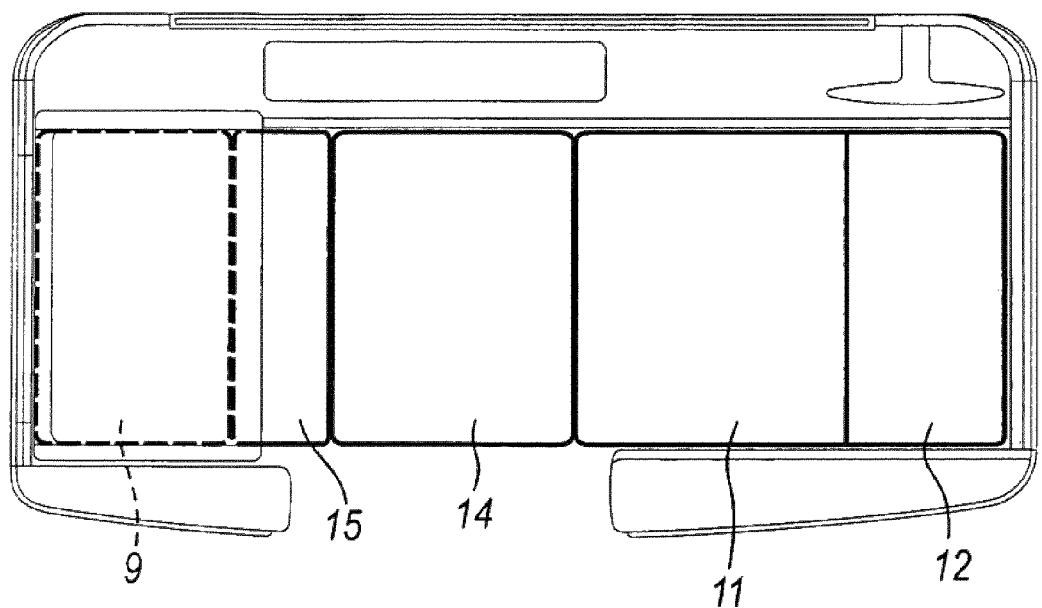
FIG. 9 is a pictorial plan view of the seat in the bed position.
Figure 10:
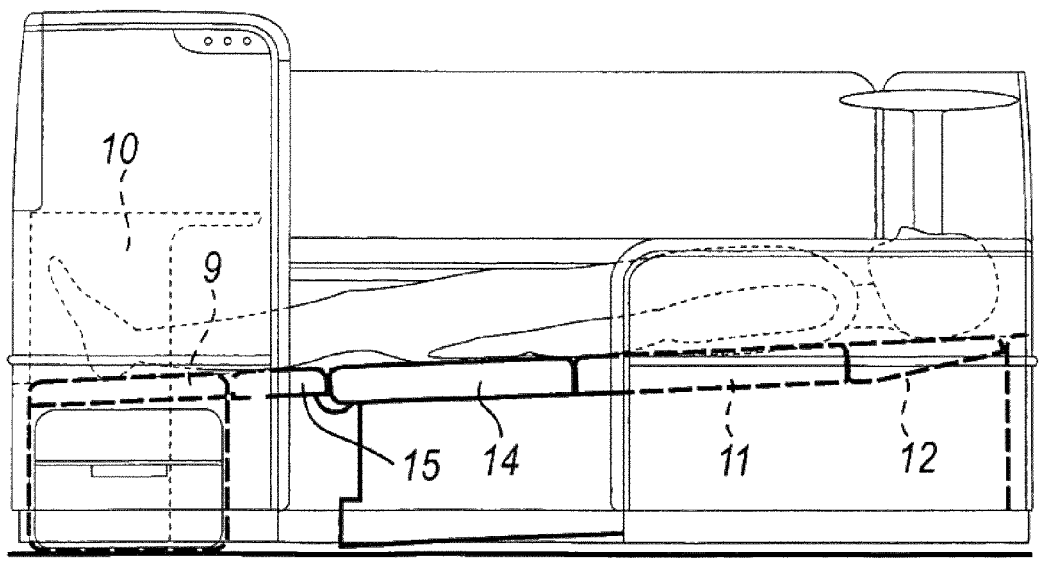
FIG. 10 is a pictorial side view of the seat in the bed position.
Figure 11:
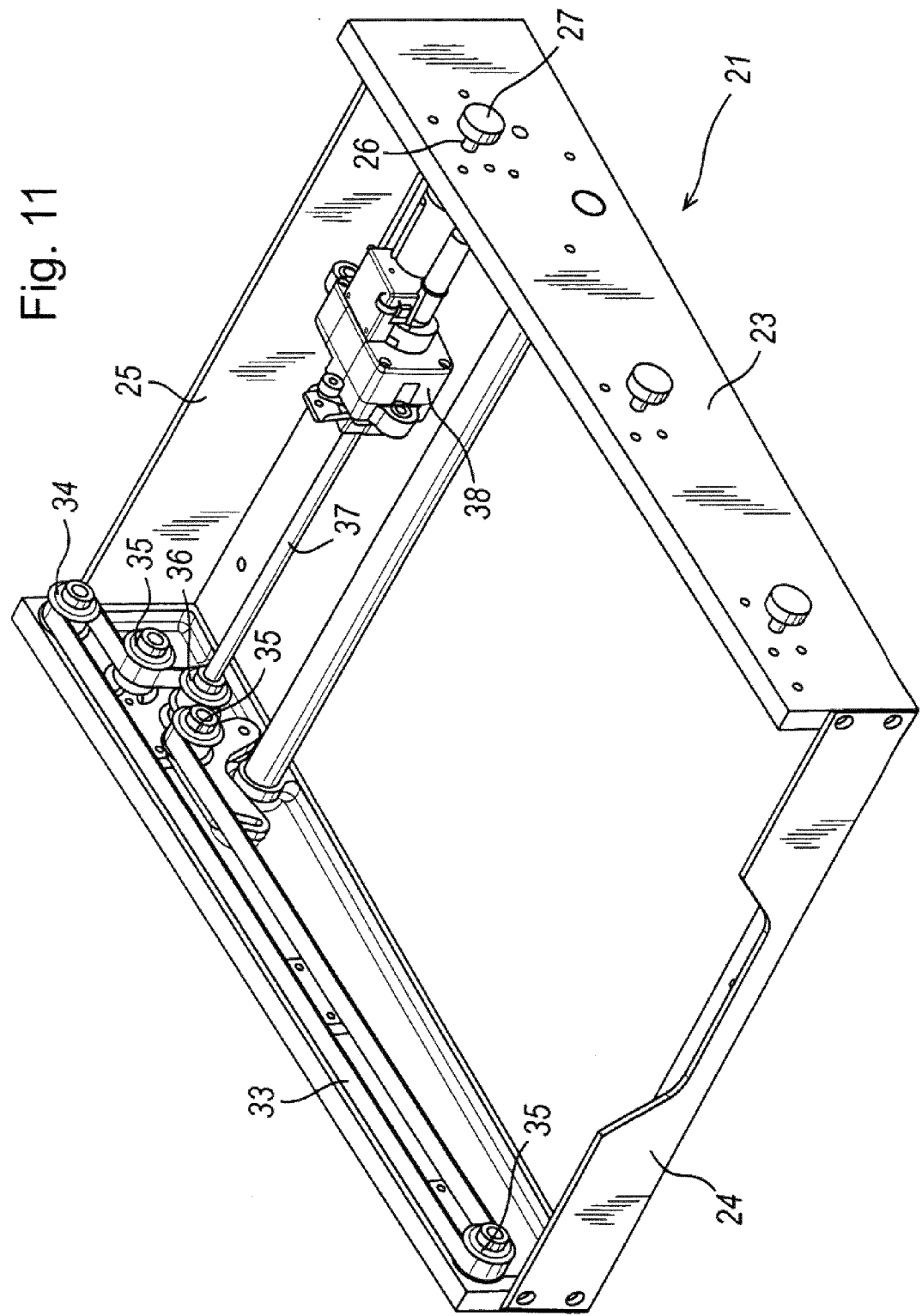
FIG. 11 is a perspective view of a chassis of the seat.
Figure 12:
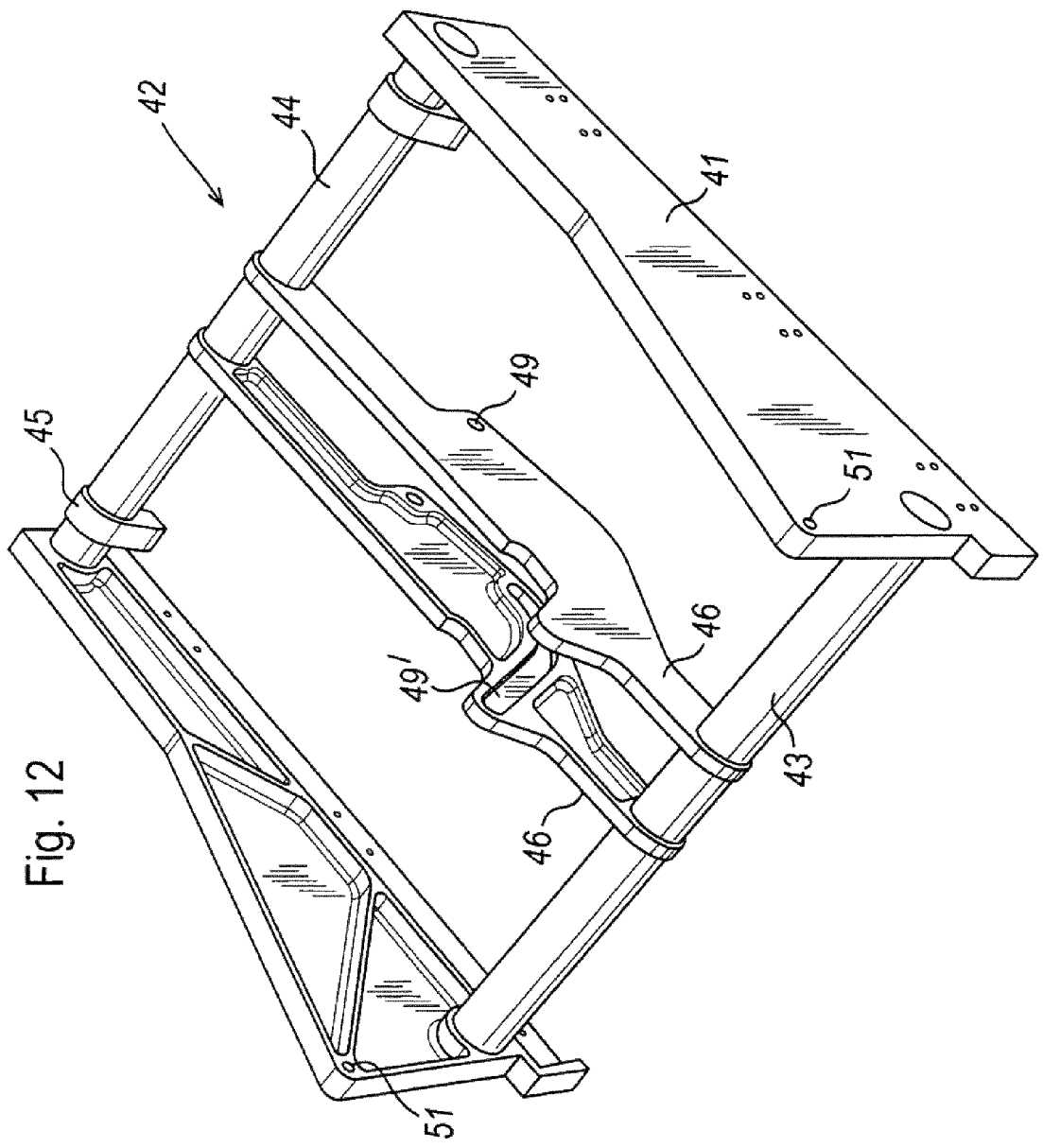
FIG. 12 is a perspective view of seat sub-frame.
Figure 13:
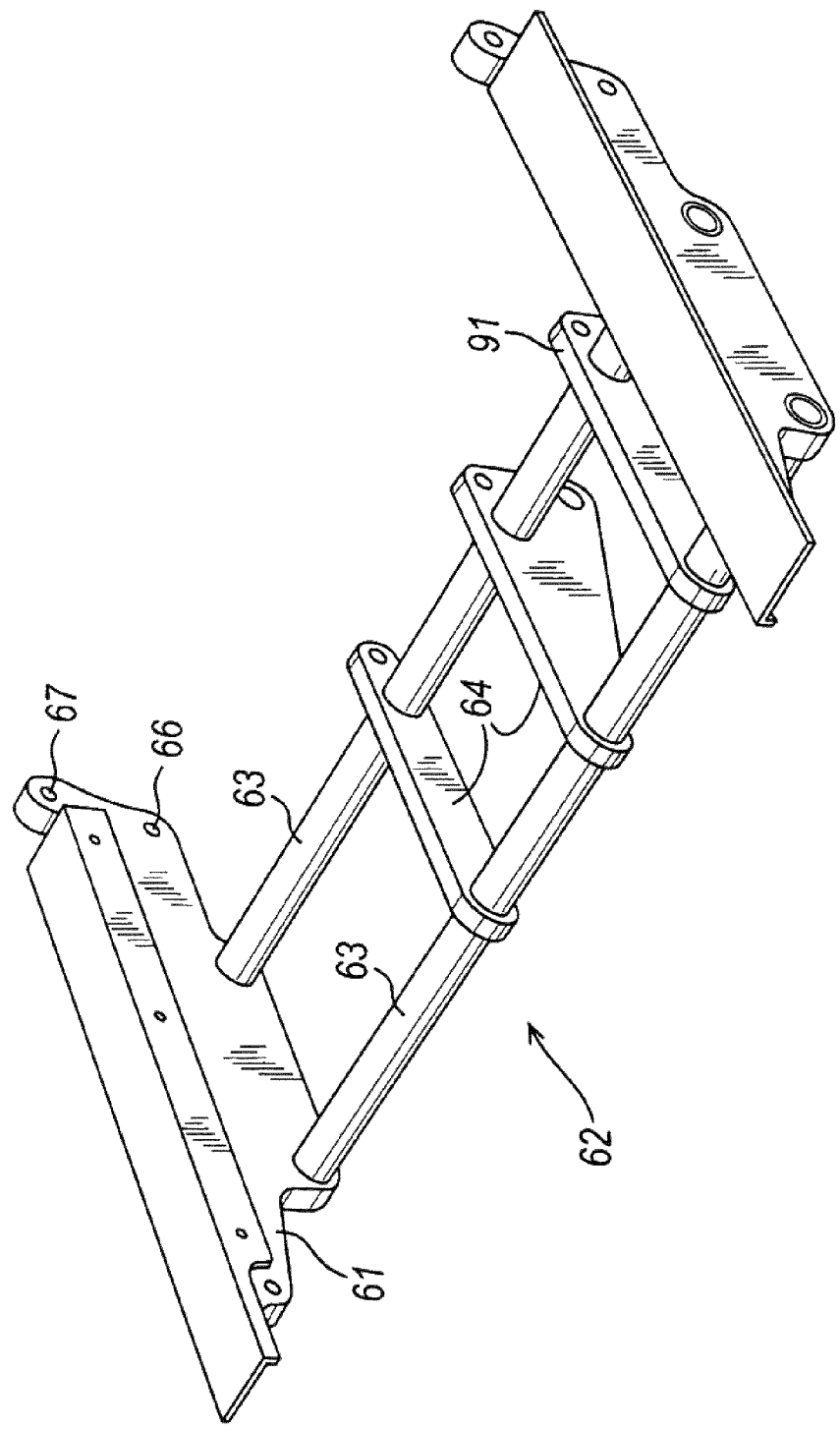
FIG. 13 is a perspective view seat pan sub-assembly.
Figure 14:
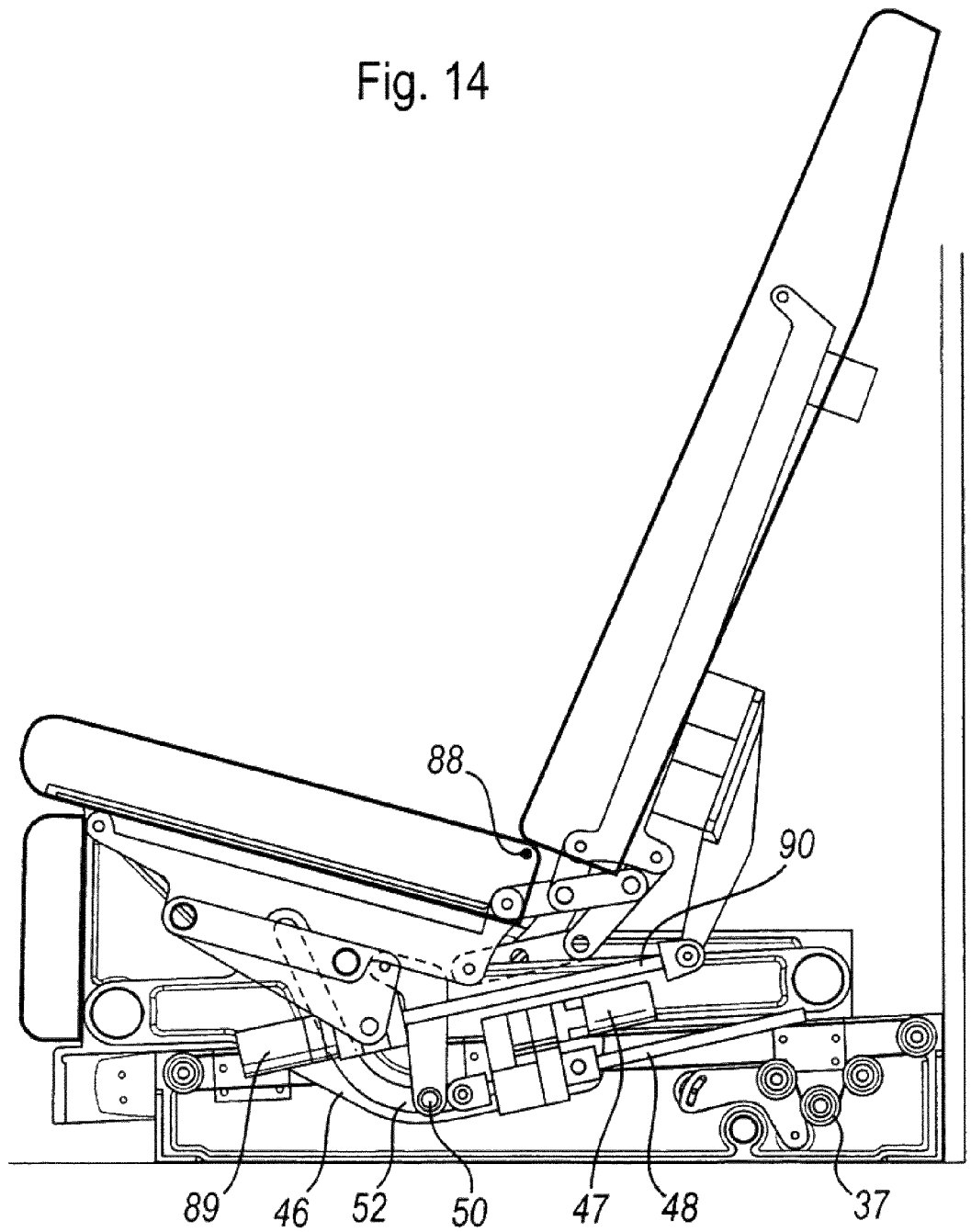
FIG. 14 is a side view of the mechanism of the seat in the TTL position.

Referring to the drawings, a seat 1 in a cubicle has a TTL position—see FIGS. 1,3 & 4, a dining position—FIGS. 5 & 6 and a bed position—FIGS. 2, 9 & 10. The cubicle has end, head and foot walls 2,3, the latter with an in-flight entertainment screen 4, and a raisable divider 5 (for use where the seat is installed in the middle of a cabin adjacent a similar mirror image one as opposed to at a cabin wall.) At the head end, the cubicle has an armrest 6, opposite the raisable screen, which is itself raisable from a normal use position to a position raised for privacy. On the same side of the cubicle at the foot end is a cupboard 7 having with an end opening door 8. A foot rest or ottoman 9 is provided, being movable towards and away from the seat. A similarly movable table 10 is provided. This is the subject of an other application filed on the same day as this application under Nigel Brooks file reference 2770.

The seat as such has a backrest 11 with a head rest 12 able to be tilted forwards with respect to the back rest, a squab 14 and a leg rest 15 able to be pivotally lifted out from below the front edge of the squab. Mechanisms for operation of the head rest and the foot rest are essentially conventional and as such will not be described.

Referring on now to FIGS. 11 to 19, the seat has a chassis 21, fixed to a pallet or floor 22 of the cubicle which is fixed to the floor of the aircraft. The chassis has two load bearing sides 23 and opposite ends 24, 25. Fixed along the top edge of the sides 23 and facing outwards are pins 26 supporting bearing wheels 27. These on each side engage with a rectangular S form interconnection beam 28 (also referred to herein as a linear runner beam) having an inside groove 29 for receiving these wheels. On the outside, the beam 28 has another groove 30 receiving similar wheels 31, on pins 32 fixed to the inside of side plates 41 of a sub-frame 42, these side plates being interconnected by front and rear beams 43, 44. Thus the sub-frame can move back and forth, with the wheels acting as rolling element bearings. The beams move half the distance of the sub-frame, in analogous manner to the bearing of filing cabinet drawers.

At both sides of the chassis and sub-frame drive belts 33 are arranged. They run around front and back guide pulleys 34, pinch pulleys 35 and drive pulleys 36. The pinch pulleys can release their grip on the belt for emergency manual movement of the sub-frame. The drive pulleys are provided at opposite ends of drive shaft 37, journalled at its ends in the side plates and connected between the drive pulleys 36 to a drive motor 38. The belts are endless and are clamped by clamps 45 to the rear beam 44 of the sub-frame. Operation of the motor thus drives the sub-frame forwards or backwards with respect to the chassis and the seat pallet 22.

The sub-frame has two cam plates 46 extending parallel to its side plates, between the beams 43, 44. These pivotally support a motor unit 47 for a nut (not shown) on a seat pan inclination lead screw 48, the pivot axis being defined by bores 49 in a low part of the cam plates. The plates have inward facing grooves 49' in front of the motor unit. A follower 50 is received in the grooves 49' and is connected to an eye at the front end of the lead screw.

Pivotally connected to the front of the sub-frame's side plates at bores 51 are side members 61 of a seat pan 62, on which the squab 14 is mounted. These are interconnected by cross members 63. Set in from the side members, the cross members carry pivot plates 64 for links 65, pivotally carried on a shaft 66 extend between the pivot plates immediately behind the rear one of the cross members. The links 65 are dog-leg shaped and connected at their lower ends to the follower 50.

Figure 8:
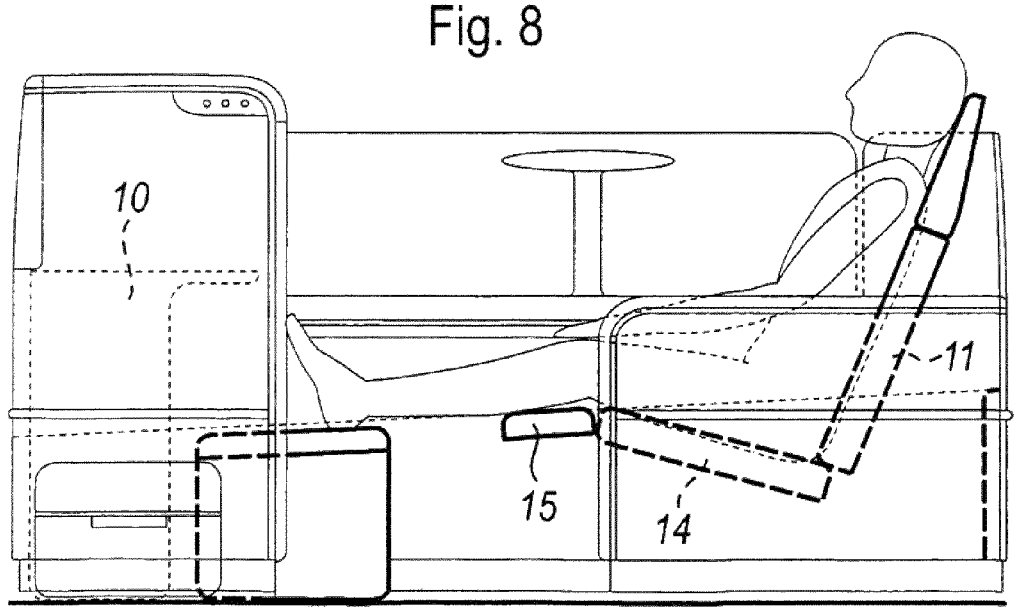
FIG. 8 is a pictorial side view of the seat in an after dinner position.

The arrangement is such that when the follower is moved backwards by the motor unit 47 into a "foot" 52 of the cam grooves 49', the links are drawn down and back and the seat pan is reclined about the pivot bores 51. This is the TTL position. Pushing of the following forwards in a lower part of a "leg" 53 of the cam grooves 49' lifts the links and the seat pan. A dining position of the seat pan is attained with the following in position shown in FIGS. 6 & 15. Further pushing of the follower up the grooves 49' to their top causes the pan to be raised kits bed position shown in FIGS. 8 & 16.

At the rear of the side members 61 of the seat pan, they have two pivot points 66, 67 one above the other, for a multi-link linkage 68 by which the seat pan is connected a back rest support 81, on which the back rest 11 is mounted. This latter has side tubes 82 and cross tubes 83.

Figure 15:
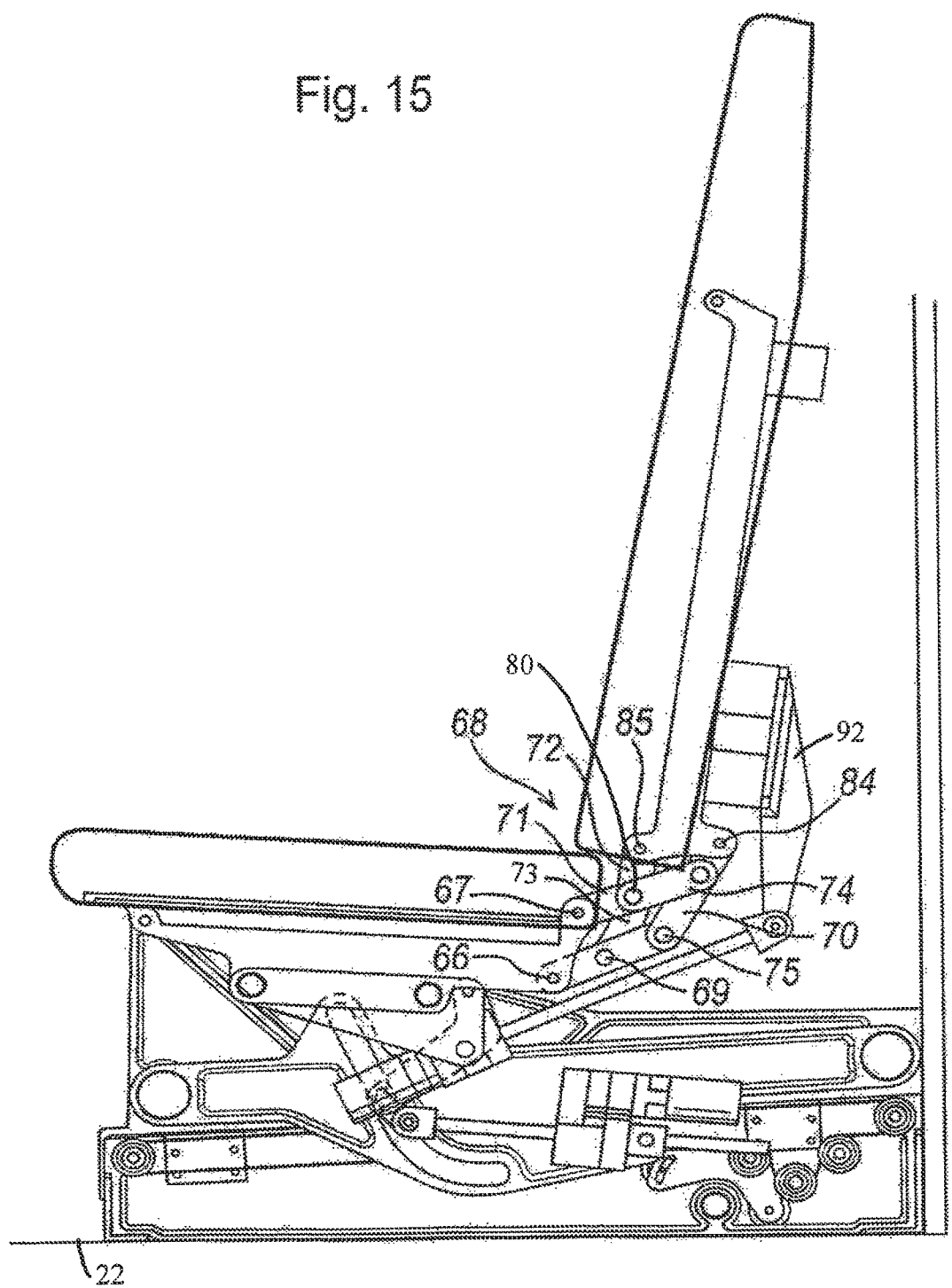
FIG. 15 is a side view of the mechanism of the seat in the dining position.
Figure 16:
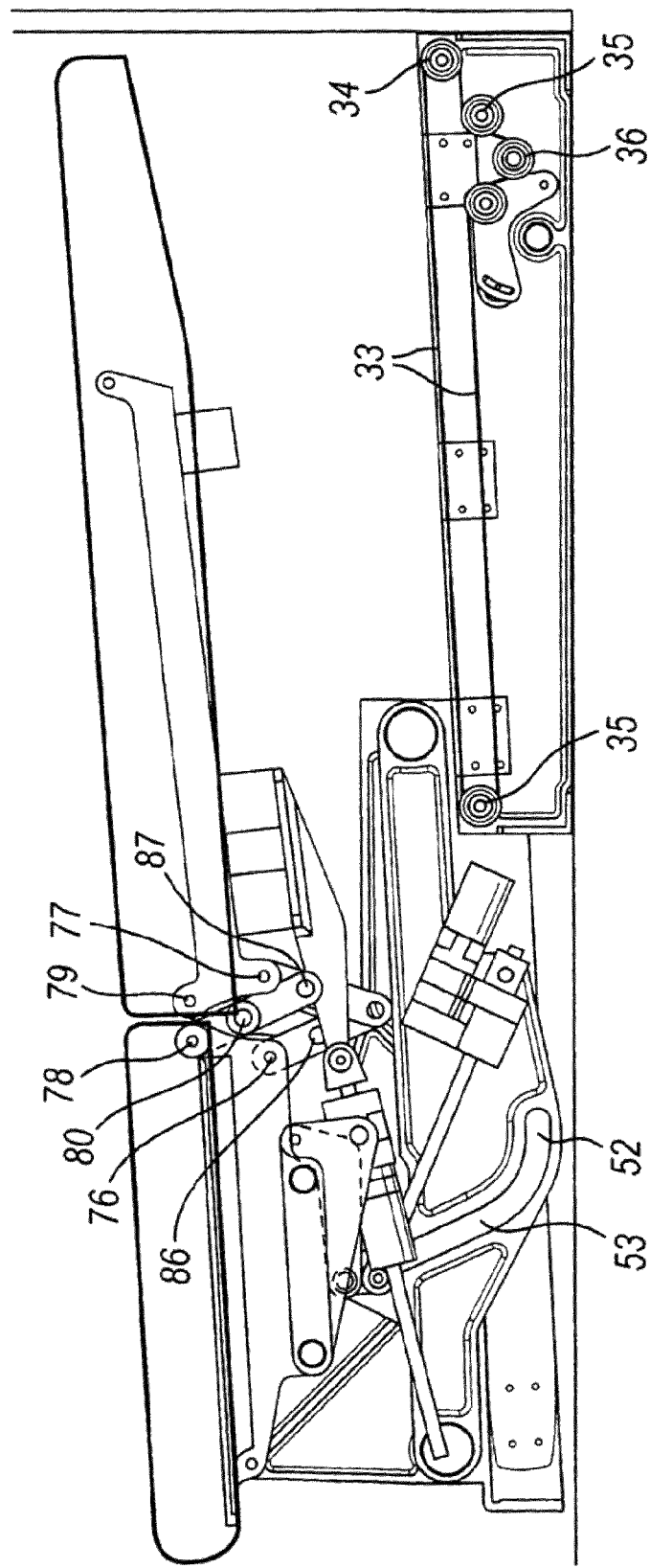
FIG. 16 is a side view of the mechanism of the seat in the bed position.
Figure 17:
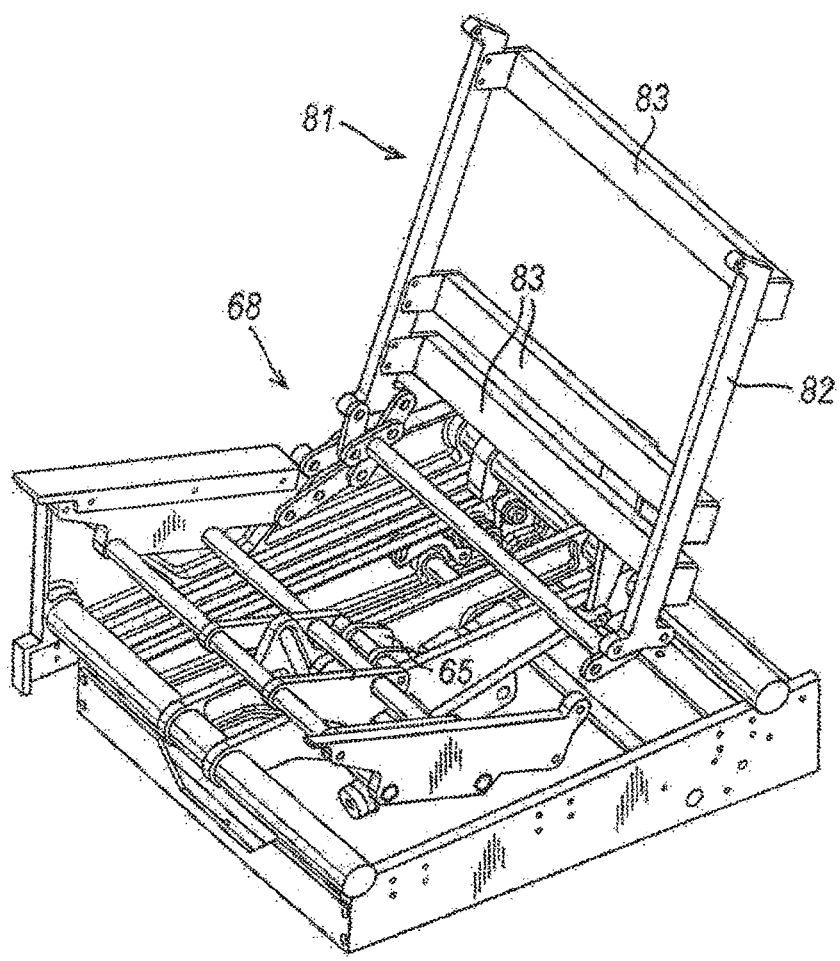
FIG. 17 is a perspective view of the mechanism, partially disassembled, in the TTL position.
Figure 18:
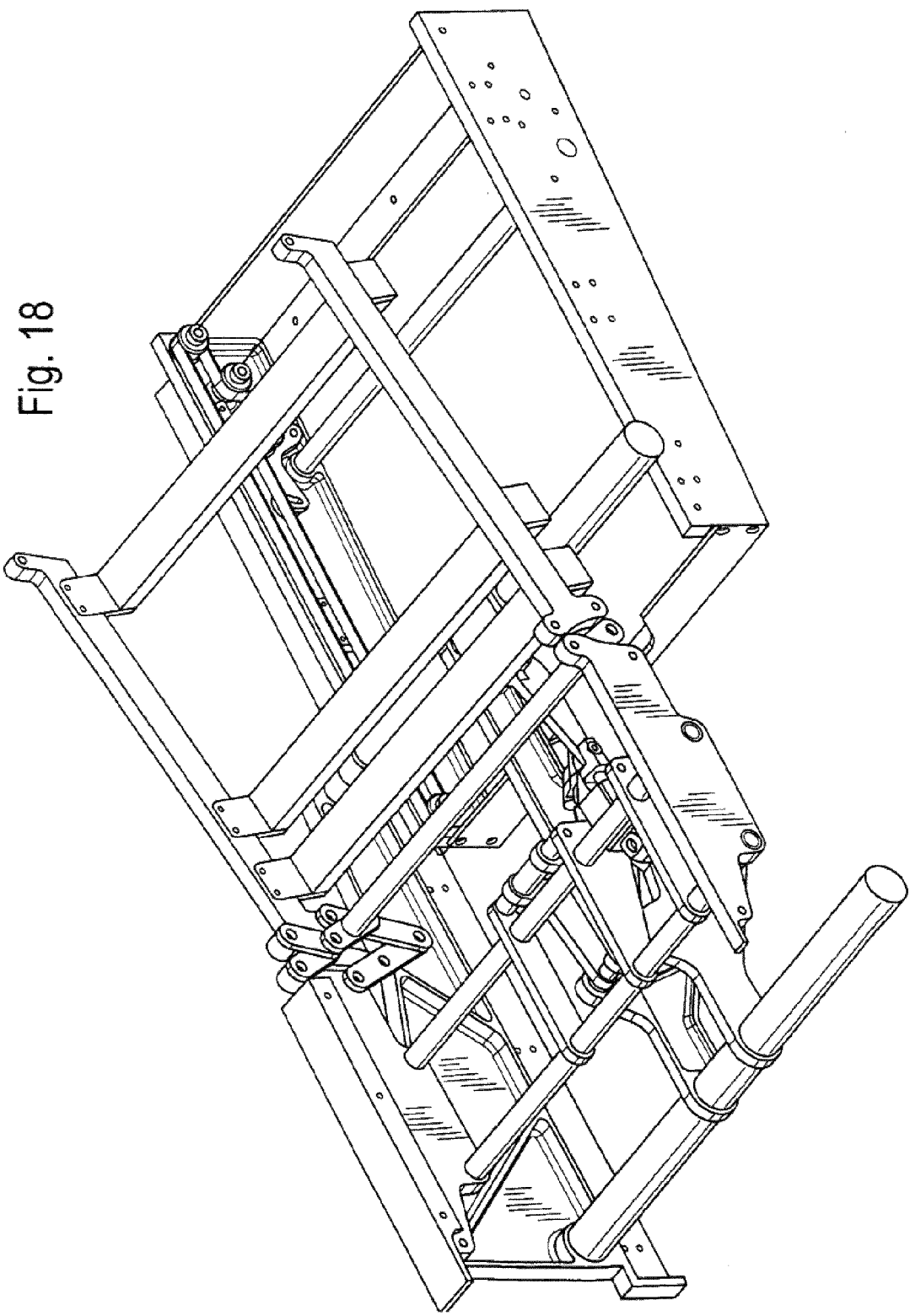
FIG. 18 is a perspective view of the mechanism, partially disassembled, in the bed position.
Figure 19:
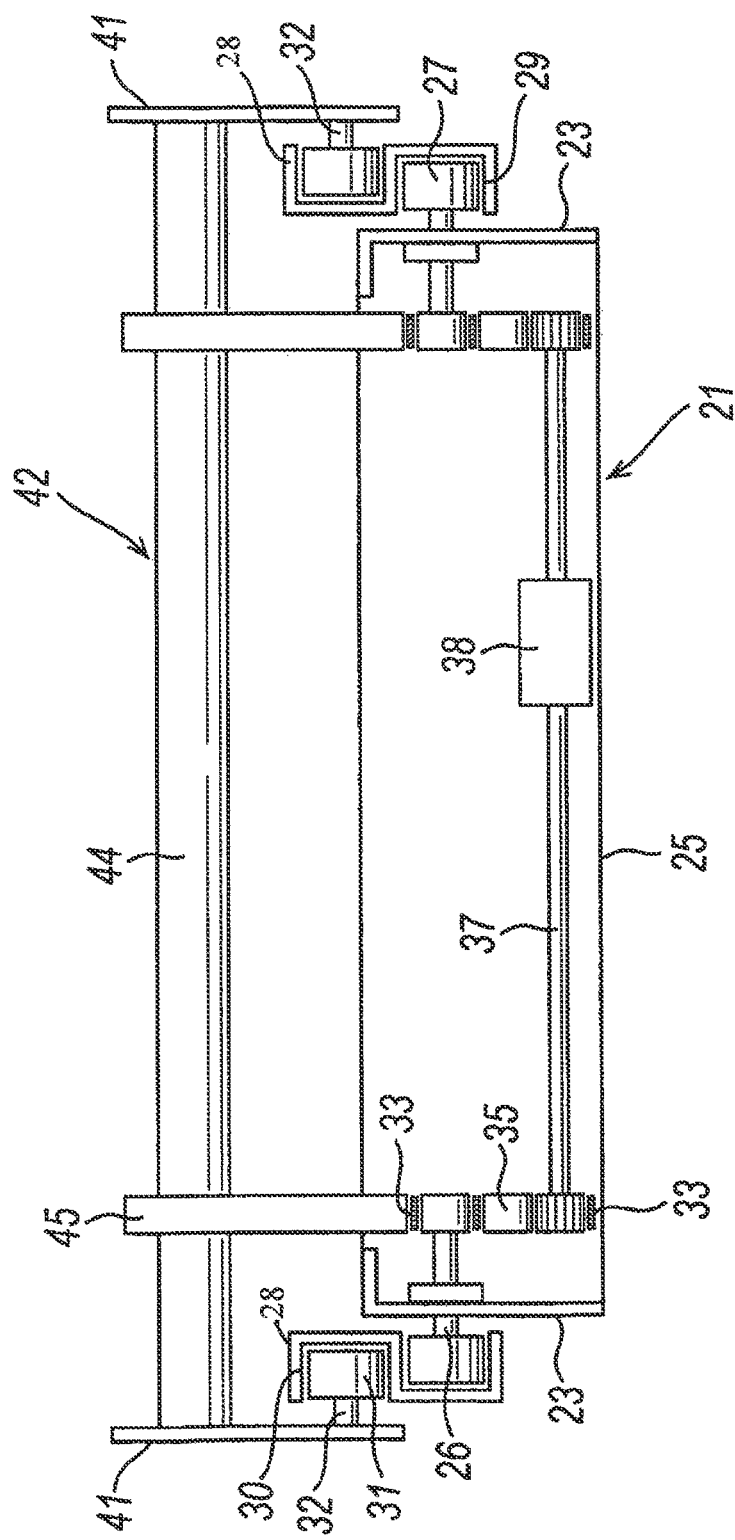
FIG. 19 is a cross-sectional view of the seat sub-frame bearingly mounted on the chassis.

With particular reference to FIGS. 15 & 16, at each side, the linkage 68 has three-pivot links 69,70 and four two-pivot links 71,72,73,74. The three-pivot links 69,70 are connected together at distal points at ones of their ends by pivots 75 and their other distal points to the respective lower ones 66,84 of the side plate pivot points 66,67 and of equivalent pivot points 84,85 on the side tubes 82 by pivots 76,77. The upper ones of the pivot points 66,67,84,85 each have one two-pivot link, that is link 71 is connected at by pivot 78 to point 67 and link 72 is connected at pivot 79 to point 85. These two links are pivoted together by pivot 80. The other links 73,74 are also connected by pivot 80 and at their other ends to the third points of the three-pivot links 69,70 by pivots 86,87. The linkage operates as a hinge about a virtual hinge axis 88 substantially at the intersection of lines through the points 66,67 and 84,85.

The actual angle of the back rest about the seat pan is controlled by a motor unit and lead screw 89,90 similar to those 47,48 controlling the inclination of the seat pan. The motor unit is pivoted to one of the pivot plates 64 and an extra plate 91. The distal end of the lead screw is connected to an arm 92 extending down from two of the cross tubes 83. Operation of the motor moves the back rest about the virtual hinge axis 88.

As is now conventional for bed-convertible seats, the actual operation between different positions is under control of a control panel for the passenger and a control system. It is believed that that these are within the abilities of the skilled man and will not be described.

The above described seat convertible to a bed has particular advantage in that the structure supporting the seat squab and back is flatter than would normally be used in an aircraft seat, improving comfort in the bed configuration. The virtual hinge has an improved movement profile that is more comfortable for the seat occupant as it has a reduced tendency to tug at clothes whilst the seat is moving from seat to bed. Additionally the virtual hinge it does not produce hard points at the edges of the bed.

The invention claimed is:

1. An aircraft seat convertible to a bed comprising:
   a seat having:
   a squab and a backrest, both being movable and
   a mechanism for moving the squab and the backrest, the mechanism having:
   a seat chassis, via which the seat can be fixed to a floor,
   a first linear runner beam mounted on the seat chassis,
   a seat frame sub-frame bearingly mounted on the first linear runner beam,
   linear drive means for extending and retracting the sub-frame on the first linear runner beam with respect to the seat chassis between a retracted position and an extended bed position,
   a pan for the squab pivotally mounted on the sub-frame,
   pan angle drive means for pivoting the pan between a back dropped TTL position and a bed position,
   a support for the back rest hinged to the pan and
   back drive means for moving the back rest support between a back up TTL position and a bed position.

2. An aircraft seat as claimed in claim 1, wherein the first linear runner beam (a) is mounted via roiling element bearings on the seat chassis, (b) has an S cross-section, and (c) comprises first and second grooves, with some of the rolling element hearings attached to the seat chassis engaging in the first groove of the first linear runner beam and the other of the rolling element hearings engaging in the second groove of the first linear runner beam.

3. An aircraft seat as claimed in claim 1, wherein the linear drive means comprises a lead screw.

4. An aircraft seat as claimed in claim 1, further comprising a second linear runner beam, and wherein the linear drive means is a pair of belts, one of the pair of belts being associated with the first linear runner beam and the other of the pair of belts being associated with the second linear runner beam, the two belts being drivable in tandem.

5. An aircraft seat as claimed in claim 4, including:
sub-frame drive belts arranged at both sides of the seat chassis;
guide pulleys at opposite ends of the seat chassis for guiding the drive belts;
drive pulleys engaging the drive belts in one run of the belts between the guide pulleys;
a drive motor mounted on the seat chassis and drivingly connected to the drive pulleys;
pinch pulleys for normally engaging the belts with the drive pulleys;
means for manual disengagement of pinch wheels to allow the drive belts to move past the drive pulleys and
means for securing another run of the drive belts to the sub-frame.

6. An aircraft seat as claimed in claim 1, wherein the sub-frame has a front and the pan is pivoted to the sub-frame at a position spaced back in the seat from the front of the sub-frame.

7. An aircraft seat as claimed in claim 1, wherein the sub-frame has a front and the pan is pivoted to the sub-frame at the front of the sub-frame.

8. An aircraft seat as claimed in claim 1, wherein the pan angle drive means comprises a crank depending below the pan and an actuator for moving a lower end of the crank back and forth.

9. An aircraft seat as claimed in claim 1, wherein the pan angle drive means comprises a depending link, pivoted to the pan and guided at its lower end in a cam groove, along which it is driven by a lead screw, having a drive nut pivotally mounted to the sub-frame.

10. An aircraft seat as claimed in claim 1, wherein the back rest support is hinged to the sub-frame.

11. An aircraft seat as claimed in claim 10, wherein the hinge is a multi-link linkage providing a pivot axis spaced below the links themselves.

12. An aircraft seat as claimed in claim 1, wherein the back drive means is an arm extending back and below the support for the back rest, and is connected at its distal end to a lead screw actuator.

13. An aircraft seat as claimed in claim 1 further comprising a second linear runner beam and in which the seat chassis defines opposed first and second sides, the first linear runner beam is mounted via rolling element bearings on the first side of the seat chassis, the second linear runner beam is mounted via rolling element bearings on the second side of the seat chassis, and the seat frame sub-frame is mounted via rolling element bearings on at least the first linear runner beam.

* * * * *